United States Patent [19]

Martin

[11] Patent Number: 4,576,041
[45] Date of Patent: Mar. 18, 1986

[54] DYNAMIC BALANCING MEANS FOR AN OIL WELL PUMPING UNIT

[75] Inventor: Roy D. Martin, Albert, Kans.

[73] Assignee: Texaco Inc., White Plains, N.Y.

[21] Appl. No.: 619,441

[22] Filed: Jun. 11, 1984

[51] Int. Cl.⁴ .......................... G01L 3/14; G01L 5/06
[52] U.S. Cl. ........................................ 73/151; 73/168;
73/862.19; 73/862.47
[58] Field of Search ...................... 73/168, 151, 862.19,
73/862.45, 862.46, 862.47, 862.48

[56] References Cited

U.S. PATENT DOCUMENTS

| 1,168,925 | 1/1916 | Zanzig | 73/862.19 |
| 2,691,300 | 10/1954 | Morris | 73/151 X |
| 3,210,994 | 10/1965 | Saxl | 73/862.47 |
| 4,194,393 | 3/1980 | Boley | 73/151 |

Primary Examiner—Charles A. Ruehl
Attorney, Agent, or Firm—Robert A. Kulason; James J. O'Loughlin; Henry C. Dearborn

[57] ABSTRACT

A tension indicator is applied to the belt of a belt driven oil well pumping unit. The pumping unit is driven by an internal combustion engine, and the tension indicator is read for at least one complete cycle of the pumping unit so that the up and down strokes may be dynamically balanced.

3 Claims, 4 Drawing Figures

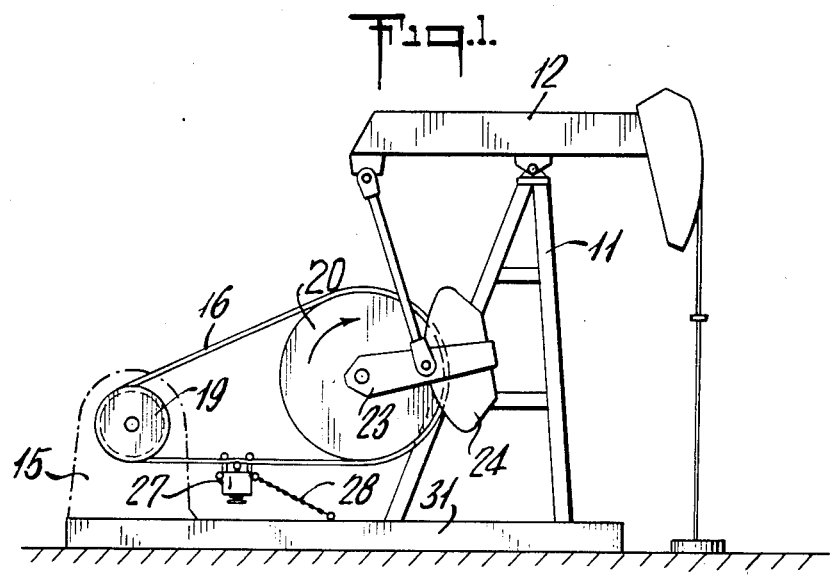
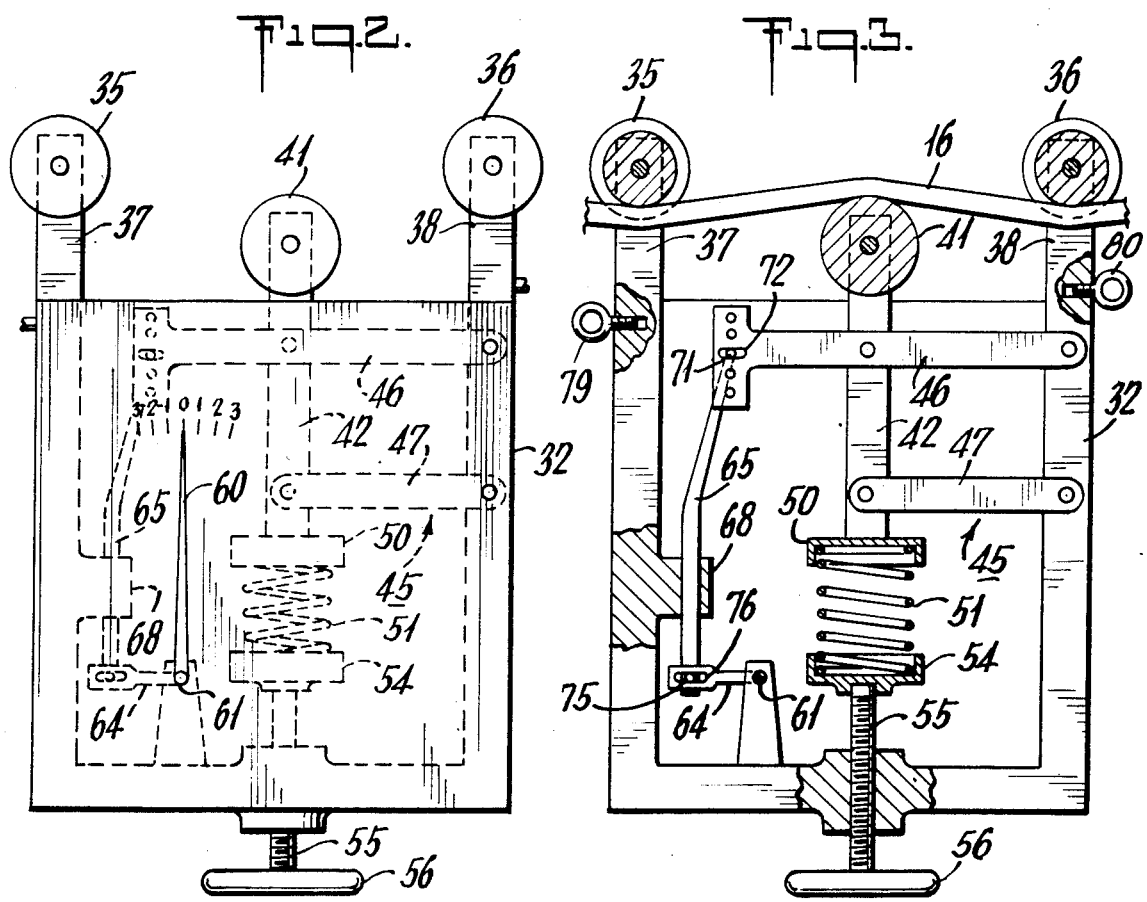

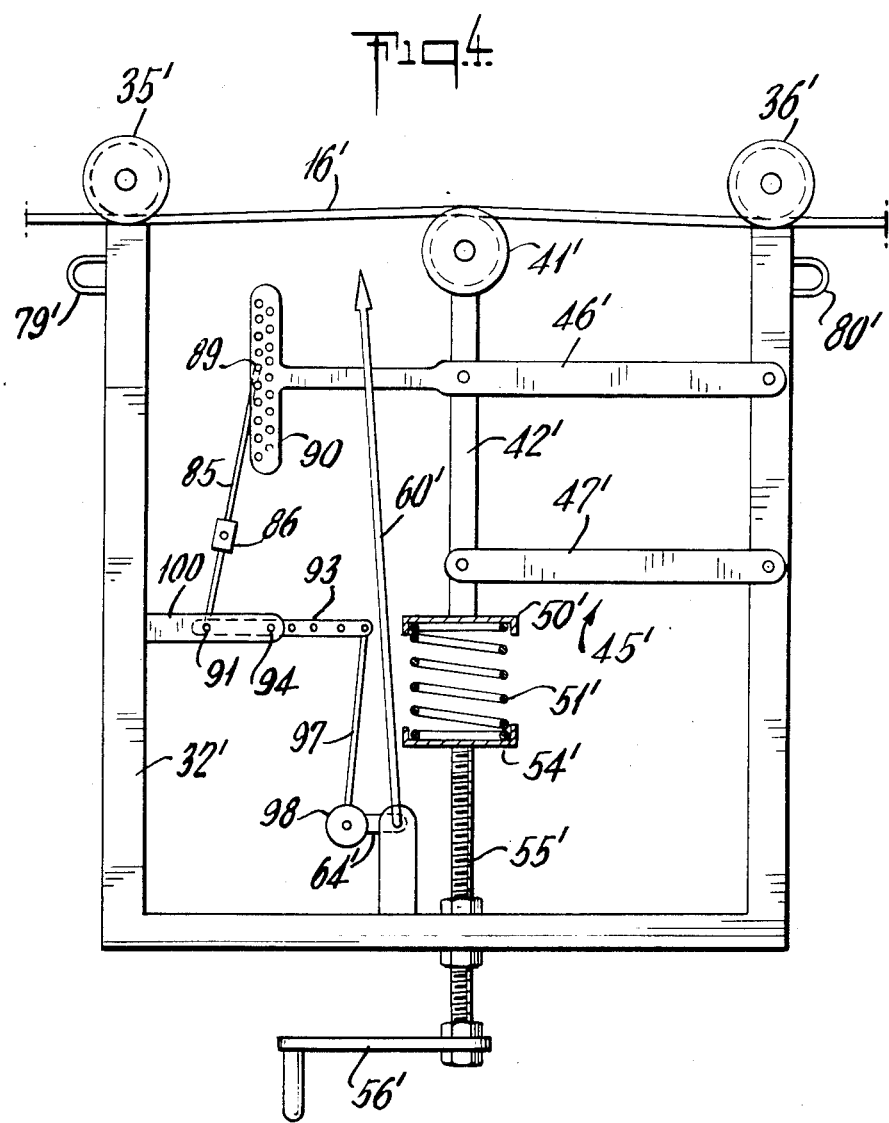

DYNAMIC BALANCING MEANS FOR AN OIL WELL PUMPING UNIT

BRIEF SUMMARY OF THE INVENTION

This invention concerns oil well pumping units, in general. More specifically, it relates to a tension measuring instrument which may be applied to the belt drive of a pump jack that is driven by an internal combustion engine.

In numerous pumping units that are operating in oil fields that are remote from any electric power, it is usual to drive a pump jack type of reciprocating pumping unit with an internal combustion engine, which is connected to the pumping unit with belt drive. In order to increase the efficiency of such units, it is best to balance the driving force in so far as possible between the up-stroke and the down stroke of the pump jack which acts to reciprocally lift and return a string of connecting rods that go to a reciprocating pump down in the well. Heretofore, a usual procedure for balancing the pump jack has been to stop the unit with the counterweights in a horizontal position. Then by shifting the weights until they remain in the horizontal position when the brake has been released, it was assumed that a balance was obtained. However, that method fails to take any account of the momentum of the counterweights and the other moving parts in action as the pumping unit is being operated. Thus, it is an object of this invention to provide a tension measuring instrument that is used with the pumping unit while it is being operated in order that the driving force throughout a complete cycle of the pumping unit may be dynamically determined.

While tension measuring instruments for measuring the tension applied to a cable or the like are known, as indicated by U.S. Pat. Nos. 4,171,640, Oct. 23, 1979 and 4,241,616 Dec. 30, 1980 (both) Max V. Mastrigt, inventor, these merely employ force measuring means by a load cell. Thus, there is no suggestion for making a dynamic load measurement for dynamically balancing a pumping unit.

Briefly, the invention is in combination with an oil well pumping unit having a pump jack driven by an internal combustion engine with a belt connecting said pump jack to said engine. The invention comprises means for dynamically balancing said pumping unit. And that means comprises means for indicating tension being applied to said belt while said pumping unit is running throughout at least one full cycle of said pump jack.

Again briefly, the invention is in combination with an oil well pumping unit having a pump jack driven by an internal combustion engine with a belt connecting said pump jack to said engine. It provides means for dynamically balancing said pumping unit which comprises means for indicating tension being applied to said belt while said pumping unit is running thoughout at least one full cycle of said pump jack. It also comprises means for restraining said tension indicating means against movement with said belt. The said tension indicating means comprises a frame having a pair of guide pulleys thereon, and a tension pulley between said guide pulleys. It also comprises a pantograph means for attaching said tension pulley to said frame, and spring means for biasing said tension pulley toward said belt. It also comprises means for adjusting said spring bias, and an elongated pointer pivotally mounted at the base thereof. It also comprises a crank arm attached to said pointer at said base thereof, and pivotal linkage means connecting said pantograph means to said crank arm for indicating the tension on said belt.

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic showing of a pumping unit with a dynamic balancing means attached thereto;

FIG. 2 is a side elevation, enlarged, showing one form of the dynamic balancing instrument according to the invention;

FIG. 3 is a side elevation like FIG. 2 but with a side panel removed and partially in cross section plus showing a belt in place; and FIG. 4 is a side elevation showing of a preferred modification of a balancing instrument similar to that illustrated in FIGS. 2 and 3.

The invention is in combination with an oil well pumping unit such as a typical one illustrated in FIG. 1. As there shown, there is a well pumping unit 11 that has a pump jack 12 which is driven by an internal combustion engine 15 using a belt 16. Belt 16 connects the pump jack 12 to the internal combustion engine 15 via the usual pulleys 19 and 20. The pulley 20 has a crank arm 23 which is attached to and rotated by the pulley 20. The crank arm 23 has an adjustable counterweight 24 positioned on the crank arm 23 in a conventional manner.

A tension indicating means 27 is applied to the belt 16 on the tension side of the belt between the pulleys 19 and 20. There is a rope or cable 28 that connects the tension indicating instrument 27 to any stationary object e.g., a base 31 upon which the pumping unit rests. This cable 28 holds the tension indicating means 27 against movement with the belt 16 as the pumping unit is being driven.

FIGS. 2 and 3 illustrate one form of an indicating instrument 27. It has a frame 32 that has a pair of guide pulleys 35 and 36 that are mounted for free rotation on upright extensions or arms 37 and 38 of the frame 32. These pulleys 35 and 36 have groved peripheral surfaces for keeping them on the belt 16.

There is a tension pulley 41 that has a flat surface. It is mounted on the upper end of an arm 42 which is part of a pantograph means 45 that supports the tension pulley 41 on the frame 32. Thus, there are parallel arms 46 and 47 that are pivoted on the frame 32 and also pivotally connected to the arm 42 so that the tension pulley 41 may freely move vertically with the arm 42 parallel to the frame 32.

At the other end of the arm 42 from the pulley 41 there is a socket 50 for receiving one end of a spring 51 the other end of the spring 51 is supported by another socket 54 that is carried by the end of a threaded shaft 55 which has a handle 56 at the outer end in order that the vertical position of the socket 54 may be adjusted by rotating the handle 56 and the shaft 55 in the threaded hole through the bottom of the frame 32.

There is a relatively long pointer 60 (FIG. 2) that is pivotally mounted at the base thereof by being firmly attached to a shaft 61 to which is also fixed a crank arm 64. There is a pivotal linkage means which connects the pantograph 45 to the crank arm 64 in order to swing the pointer 60. That linkage includes a vertical connecting rod 65 that is mounted for free vertical movement in a hub 68. The rod 65 is pivotally attached at the ends by having a pin 71 (FIG. 3) at the top end which goes through an elongated slot 72 in the arm 46. At the lower end of the connecting rod 65 there is a pin 75 that goes through an elongated slot 76 in the crank arm 64. It will be noted that the linkage which connects the arm 46 with the crank arm 64 acts to change vertical translation of the tension pulley 41 into rotational motion of the pointer 60. It will also be understood that the tension applied to the spring 51 biases the pulley 41 toward the belt 16.

The frame 32 has a pair of eye-lets 79 and 80, one of which is used for attaching the restraining cable or rope 28 in order to hold the tension indicating means 27 from moving along with the motion of the belt 16.

FIG. 4 illustrates a preferred embodiment of the tension indicating instrument 27 that is illustrated in FIG. 1. It is basically like the form illustrated in FIGS. 2 and 3 and the parts which remain the same are designated by the same reference numerals but with prime marks added. The FIG. 4 embodiment differs from that of the FIGS. 2 and 3 substantially only by reason of its having a series of pivoted connectors between the end of the arm 46' and the end of the crank arm 64', instead of the one connecting rod 65.

In the FIG. 4 embodiment there is an upper connecting rod 85 that has a collar 86 with a set screw arrangement so as to be able to adjust the length of the rod 85. It has a pivotal connection at the upper end with one of a series of holes 89 in an end portion 90 of the arm 46' of the pantograph 45'. The other end of the rod 85 is pivotally connected at a pin or hole 91 near one end of a lever arm 93 that pivots about a centrally located point 94. There is another connecting rod 97 that is pivotally connected between the other end of the lever arm 93 and the outer end of the crank arm 64' which has a counter weight 98 thereon. The linkage means of connecting rods 85, 97 and lever arm 93 are all supported at the pivot point 94 which is located near the outer end of an arm 100 that is securely attached to the side of the frame 32'.

It will be understood that in both embodiments the linkage which connects the end of the upper pantograph arm 46 with the crank arm 64, positions the pointer so as to provide an indication of the tension on the belt 16.

Also it will be understood that the action of dynamically balancing the pumping unit involves running the engine 15 sufficiently so as to carry out at least one full cycle of the pumping unit through both its up and down strokes. That is done while watching the tension indicator as shown by the pointer 60 of the tension unit 27. That will show whether the tension during up strokes is different from the tension during down strokes. Then if those tensions differ the unit will be stopped and an appropriate adjustment will be made to the counter weight 24.

While a particular embodiment of the invention has been described above in considerable detail in accordance with the applicable statues, that is not to be taken as in any way limiting the invention but as merely being descriptive thereof.

I claim:

1. In combination with an oil well pumping unit having a pump jack driven by an internal combustion engine with a belt connecting said pump jack to said engine,
   means for dynamically balancing said pumping unit, comprising
   means for indicating tension being applied to said belt while said pumping unit is running throughout at least one full cycle of said pump jack, and
   means for restraining said tension indicating means against movement with said belt,
   said tension indicating means comprising
   (a) a frame having a pair of guide pulleys thereon,
   (b) a tension pulley between said guide pulleys,
   (c) pantograph means for attaching said tension pulley to said frame,
   (d) spring means for biasing said tension pulley toward said belt,
   (e) means for adjusting said spring bias,
   (f) an elongated pointer pivotally mounted at the base thereof,
   (g) a crank arm attached to said pointer at said base thereof, and
   (h) pivotal linkage means connecting said pantograph means to said crank arm for indicating the tension on said belt.

2. In combination with an oil well pumping unit having a pump jack driven by an internal combustion engine with a belt connecting said pump jack to said engine,
   means for dynamically balancing said pumping unit, comprising
   means for indicating tension being applied to said belt while said pumping unit is running throughout at least one full cycle of said pump jack,
   said means for indicating tension, comprising
   a frame having a pair of guide pulleys thereon,
   a tension pulley between said guide pulleys, and
   means for indicating translation of said tension pulley in response to tension on said belt,
   said means for indicating translation comprising
   pantograph means for attaching said tension pulley to said frame,
   spring means for biasing said tension pulley translation toward said belt, an indicator, and
   means for linking said pantograph means to said indicator whereby dynamic tension on said belt may be read,
   said means for dynamically balancing, also comprising
   means for restraining said tension indicating means against movement with said belt,
   said means for linking said pantograph means to said indicator comprising
   a crank arm on said indicator, and pivotal connecting means between said crank arm and said pantograph means.

3. The invention according to claim 2, wherein said indicator comprises an elongated pointer pivotally mounted at the base thereof and said crank arm being attached to said pointer at said base thereof.